(12) United States Patent
Sigot et al.

(10) Patent No.: US 7,478,587 B2
(45) Date of Patent: Jan. 20, 2009

(54) KITCHEN APPLIANCE WITH NORMALLY BLACK TRANSMISSIVE LIQUID CRYSTAL DISPLAY DEVICE

(75) Inventors: Thomas Sigot, Klagenfurt (AU); Louis Johan Bouhuys, Amersfoort (NL); Oscar Enrique Pena Angarita, London (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 763 days.

(21) Appl. No.: 10/518,261

(22) PCT Filed: Jun. 18, 2003

(86) PCT No.: PCT/IB03/02769

§ 371 (c)(1),
(2), (4) Date: Dec. 16, 2004

(87) PCT Pub. No.: WO2004/003640

PCT Pub. Date: Jan. 8, 2004

(65) Prior Publication Data

US 2005/0268793 A1     Dec. 8, 2005

(30) Foreign Application Priority Data

Jun. 26, 2002     (EP)     .................................. 02100751

(51) Int. Cl.
*A23L 1/00*     (2006.01)

(52) U.S. Cl. .......................................... 99/342; 99/403
(58) Field of Classification Search ........... 99/327–333, 99/341, 342, 348, 352–355, 485–489, 468, 99/483, 403; 219/704, 720, 702, 506, 400; 700/207, 211; 349/2; 177/2, 177, 300, DIG. 6, 177/DIG. 32

See application file for complete search history.

(56) References Cited

U.S. PATENT DOCUMENTS

| | | | | |
|---|---|---|---|---|
| 5,363,746 A | * | 11/1994 | Gordon | ........................ 99/328 |
| 5,839,356 A | * | 11/1998 | Dornbush et al. | ............. 99/331 |
| 6,064,050 A | * | 5/2000 | Ishikawa et al. | ............ 219/720 |
| 6,558,726 B2 | * | 5/2003 | Erickson et al. | ............. 426/466 |

FOREIGN PATENT DOCUMENTS

DE     4205120 A1     2/1992

* cited by examiner

*Primary Examiner*—Timothy F. Simone

(57) ABSTRACT

In a kitchen appliance (1) with a housing (2) and with a liquid crystal display device (12), the liquid crystal display device (12) is accommodated in an accommodating section (11) of the housing (2), and the accommodating section (11) is bounded, on a front face (13) and on a rear face (14), by a transparent housing-wall section (15, 16), and the liquid crystal display device (12) is in the form of a negatively transmissive liquid crystal display device (12), which is disposed between the two transparent housing-wall sections (15, 16).

4 Claims, 3 Drawing Sheets

KITCHEN APPLIANCE WITH NORMALLY BLACK TRANSMISSIVE LIQUID CRYSTAL DISPLAY DEVICE

The invention relates to a kitchen appliance equipped with a housing, which comprises housing walls, and with a liquid crystal display device which is accommodated in the housing and is provided to display data arising in the kitchen appliance, wherein the housing is equipped with an accommodating section to accommodate the liquid crystal display device.

A kitchen appliance in accordance with the generic type specified in the first paragraph above has been put into trade by the applicant in the form of two design variants with type designations HR 2388 and HR 2389, which are therefore known. In connection with a kitchen appliance in accordance with the generic type specified in the first paragraph above, reference can also be made to patent document DE 42 05 120 A1.

In the known solutions, the kitchen appliance is realized in the form of scales, wherein the housing is equipped with a main area, which is essentially circular in plan view, and a supplementary area, which protrudes laterally from the main area and assumes in plan view roughly the shape of an annular sector. Both the main area and the supplementary area of the housing exhibit only a low overall height. In the known solutions, the liquid crystal display device is in the form of a positively reflective liquid crystal display device. In the known designs, as a result of the structural design of the housing, when using large containers to accommodate an item to be weighed, the problem exists that the liquid crystal display device may be at least partially covered by the large container, as a result of which the reading of the data indicated with the aid of the liquid crystal display device may be impaired. It has further transpired that satisfactory display conditions are not always achieved with the positively reflective liquid crystal display device.

It is an object of the invention to resolve the above-cited problems and to create an improved kitchen appliance.

To achieve the above-cited object, features in accordance with the invention are provided in a kitchen appliance in accordance with the invention, so a kitchen appliance in accordance with the invention can be characterized in the manner specified below, namely:

Kitchen appliance equipped with a housing, which comprises housing walls, and with a liquid crystal display device which is accommodated in the housing and is provided to display data arising in the kitchen appliance, wherein the housing is equipped with an accommodating section for accommodating the liquid crystal display device and wherein the accommodating section is bounded, on both a front face and on a rear face opposite the front face, by a transparent housing-wall section, and wherein the liquid crystal display device is in the form of a negatively transmissive liquid crystal display device, and wherein the negatively transmissive liquid crystal display device is disposed between the two transparent housing-wall sections of the housing, and wherein the front face of the negatively transmissive liquid crystal display device is disposed adjacent to the transparent housing-wall section on the front face of the housing.

An improved kitchen appliance is obtained through the use of a negatively transmissive liquid crystal display device, this being achieved in a simple manner through the provision of the features in accordance with the invention, since, in the kitchen appliance in accordance with the invention, by virtue of the lighting conditions normally prevailing in a kitchen or a comparable room, display conditions that are virtually always correct and satisfactory, which are based to a considerable extent on the properties of a negatively transmissive liquid crystal display device obtain, which properties have proved extremely advantageous in the lighting conditions normally prevailing in a kitchen or a comparable room, as has transpired under test conditions. One further and especially great advantage consists in the fact that the negatively transmissive liquid crystal display device can be lit from the rear with a light source, as a result of which the very optimum display conditions are then achieved.

In a kitchen appliance in accordance with the invention, it has proved extremely advantageous if, in addition, the features as claimed in claim 2 are provided. As a result, the unhindered, easy reading of the data indicated with the aid of the negatively transmissive liquid crystal display device is always ensured.

In a kitchen appliance as cited in the previous paragraph, it has proved especially advantageous if, in addition, the features as claimed in claim 3 are provided. An especially convenient, unhindered reading of displayed data is ensured in this manner.

A kitchen appliance in accordance with the invention may be in the form of a kitchen machine for blending, mixing and/or chopping foodstuffs. It has proved especially advantageous if the kitchen appliance in accordance with the invention is in the form of a set of scales. In a set of scales, the measures in accordance with the invention have proved especially advantageous.

The above-mentioned aspects and further aspects of the invention are explained below.

The invention will be further described with reference to examples of embodiments shown in the drawings, to which, however, the invention is not restricted.

Figure 1:
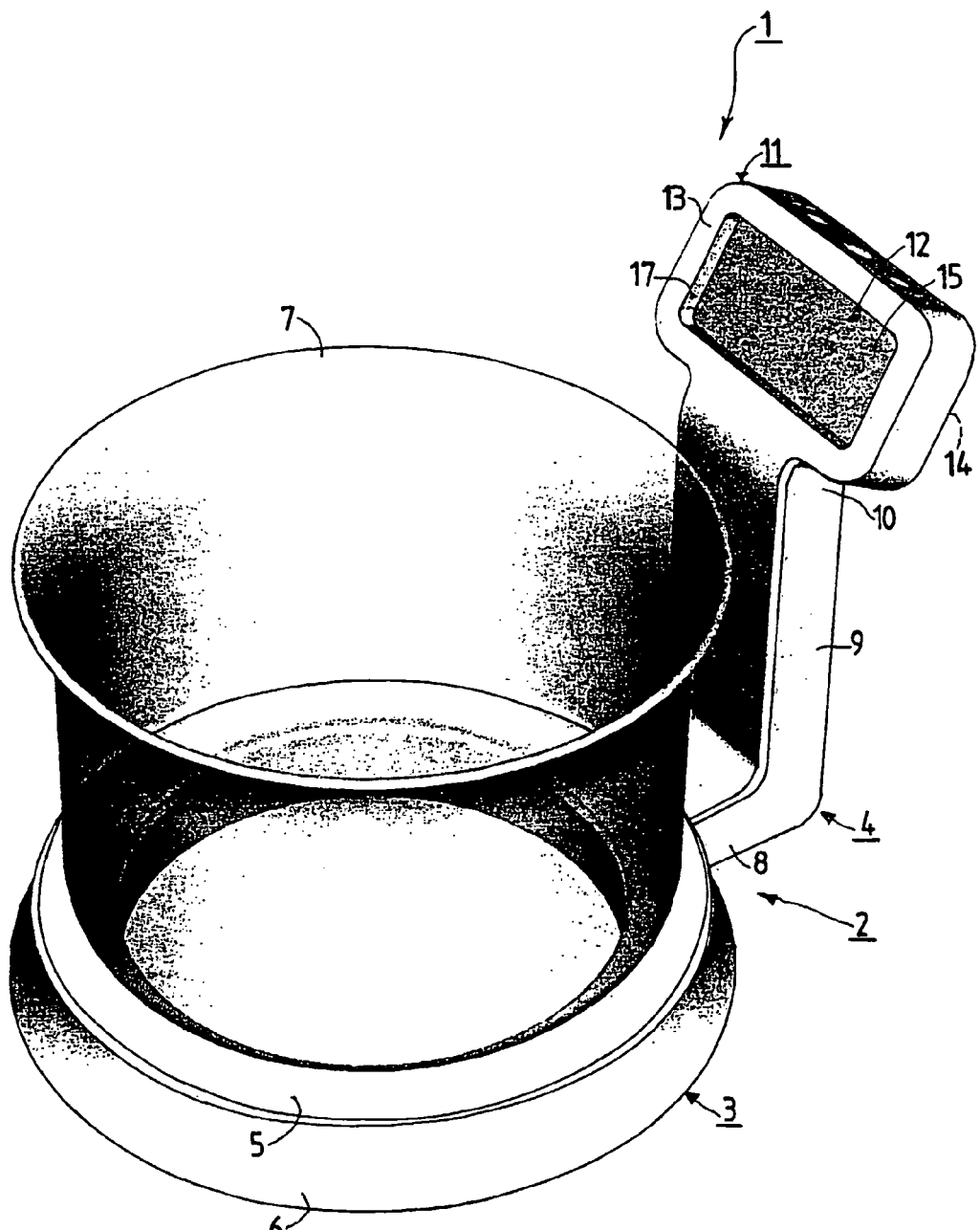
FIG. 1 shows, in an oblique view from above, a kitchen appliance in accordance with one embodiment of the invention.

FIG. 1 shows a kitchen appliance 1, which, in the present case, is in the form of a set of kitchen scales 1. The kitchen scales 1 are equipped with a housing 2, which comprises a multiplicity of housing walls and which is equipped with a main area 3 and a supplementary area 4. The main area 3 of housing 2 comprises a circular cover wall 5 and a side wall 6, developed roughly in the shape of a truncated cone, and a base wall not shown in the Figures. Onto the cover wall 5 can be placed a container 7, which is provided to receive items to be weighed.

The supplementary area 4 of housing 2 is equipped with an L-shaped development, wherein a shorter base section 8 and a longer top section 9 are provided. The base section 8 of supplementary area 4 is connected to the main area 3 of housing 2. In the area of the free end 10 of top section 9, an accommodating section 11 having a shape wider than top section 9 is connected to top section 9.

Accommodating section 11 of housing 2 is provided and designed to accommodate a liquid crystal display device 12, which liquid crystal display device 12 is accommodated in the accommodating section 11 of housing 2 and is provided to display data, especially weight data, arising in the kitchen appliance. In kitchen appliance 1, liquid crystal display device 12 is, in an advantageous manner, in the form of a negatively transmissive liquid crystal display device 12. The accommodating section 11 of housing 2 is hereby bounded, on a front face 13 and on a rear face 14 opposite the front face 13, by a transparent housing-wall section 15 and 16 respectively. The first transparent housing-wall section 15 and the second transparent housing-wall section 16 are each hereby in the form of a plastic part, which is panel-shaped and transparent, inserted in windows 17 and 18 respectively in accommodating section 11. The two housing-wall sections 15 and 16 may, however, also comprise glass. As can be clearly seen in FIG. 3, the negatively transmissive liquid crystal display device 12 is disposed between the two transparent housing-wall sections 15 and 16 of housing 2, wherein the front face 19 of the negatively transmissive liquid crystal display device 12 is disposed adjacent to the first transparent housing-wall section 15 on the front face 13 of housing 2.

As can be seen in FIG. 1, top section 9 runs essentially vertically if kitchen scales 1 are set down on a horizontal work surface, wherein the accommodating section 11 runs transversely in relation to top section 9, as a result of which the convenient reading of the negatively transmissive liquid crystal display device 12 is ensured.

Figure 3:
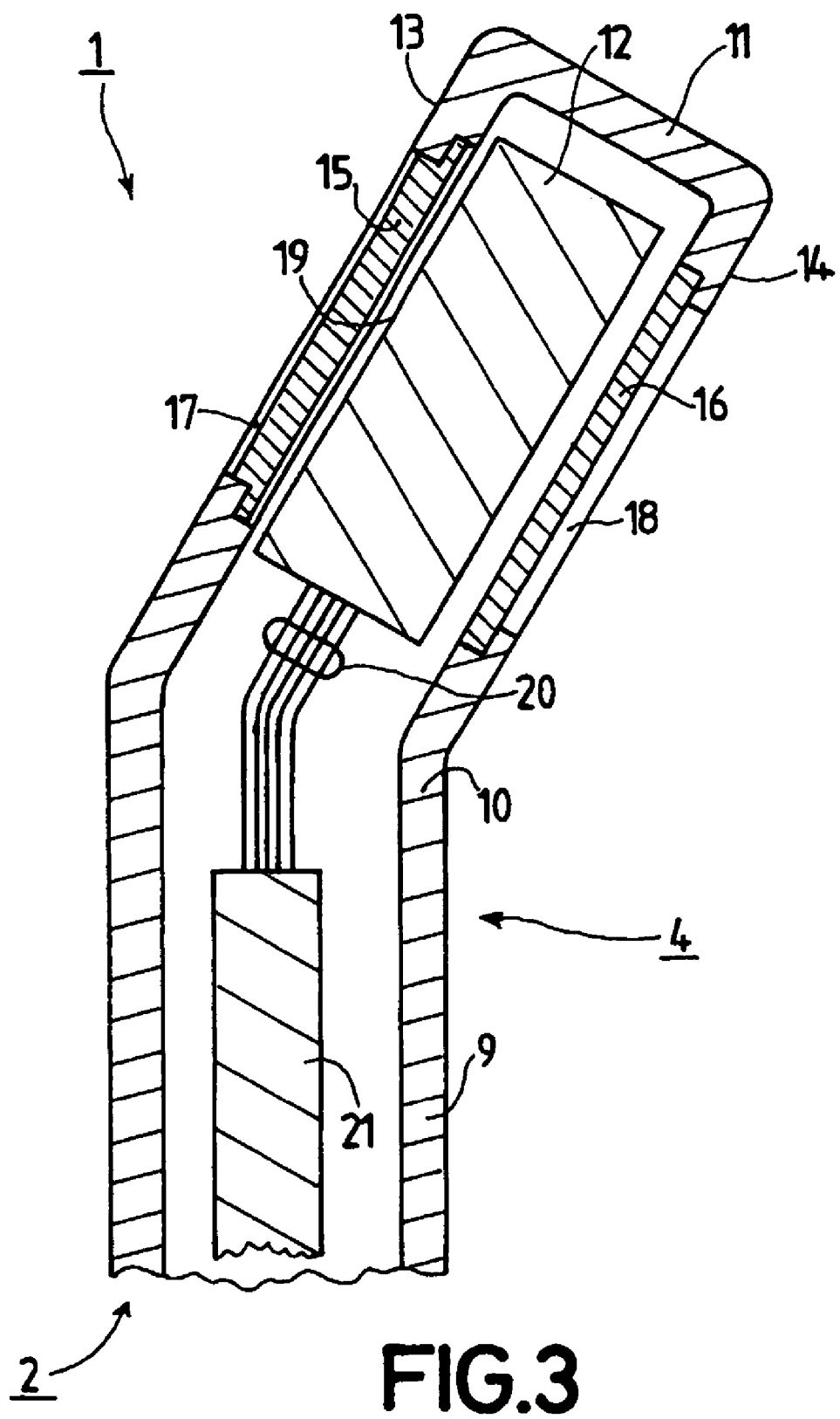
FIG. 3 shows schematically, in cross-section, an accommodating section to accommodate a liquid crystal display device of the kitchen appliance in accordance with FIGS. 1 and 2.

The negatively transmissive liquid crystal display device 12 is connected via connecting leads 20 to an electronic driver circuit 21, which is indicated schematically in FIG. 3. The negatively transmissive liquid crystal display device 12 is provided and designed to display weight data. To determine the weight data, a means for determining the weight of items to be weighed, contained in container 7, is contained in main area 3 of kitchen scales 1. To this end, an annular chassis 22 is provided in main area 3. Connected to chassis 22 are a total of 4 foot configurations 23, 24, 25 and 26. Each foot configuration 23 to 26 contains a sensor 27, 28, 29, 30, which is designed according to the resistance strain gauge principle, and which is provided for determination of the weight to be determined. Each of the four sensors 27 to 30 emits a sensor signal to a microprocessor, which is not shown, which determines the weight to be determined from the four sensor signals, and, according to the weight determined, emits a control signal to the driver circuit 21, which driver circuit 21 generates a display signal, which is displayed with the aid of the negatively transmissive liquid crystal display device 12.

Figure 2:
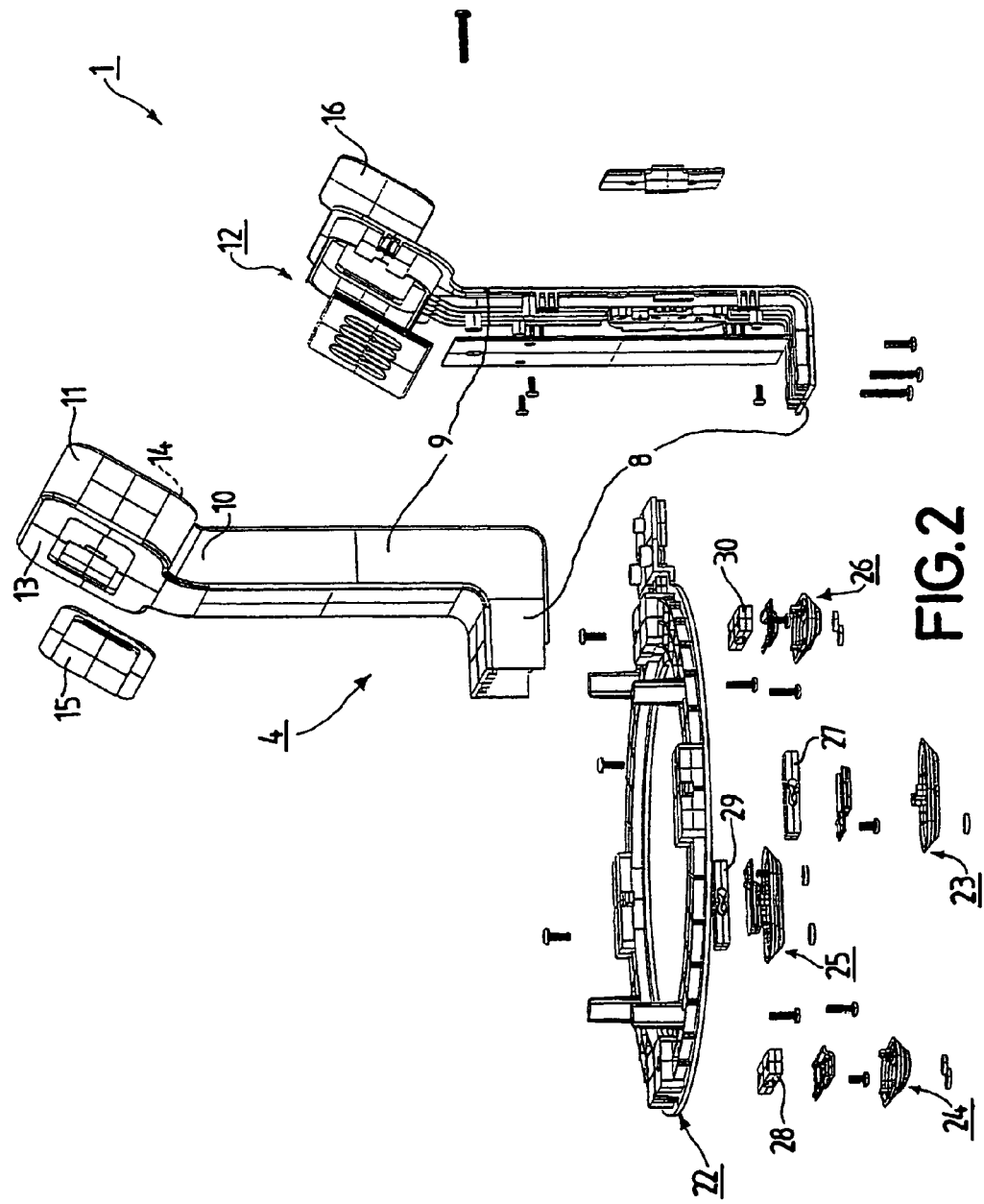
FIG. 2 shows, in an exploded view, some of the significant components of the kitchen appliance in accordance with FIG. 1.

In kitchen scales 1 in accordance with FIGS. 1 to 3, the accommodating section 11 is non-adjustably connected to top section 9. However, a design may also be realized in which accommodating section 11 is swivel-connected to top section 9, wherein the inclination position of accommodating section 11 can then be adjusted in relation to top section 9.

The measures in accordance with the invention are advantageous not just in the case of kitchen scales but also in other kitchen appliances, for instance kitchen machines, mixers and similar kitchen appliances.

The invention claimed is:

1. A kitchen appliance equipped with a housing, which comprises housing walls, and with a liquid crystal display device, which is accommodated in the housing and is provided to display data arising in the kitchen appliance, wherein the housing is equipped with an accommodating section for accommodating the liquid crystal display device, and wherein the accommodating section is bounded, on a front face and on a rear face opposite the front face, by a transparent housing-wall section, and wherein the liquid crystal display device is in a form of a negatively transmissive liquid crystal display device, and wherein the negatively transmissive liquid crystal display device is disposed between the two transparent housing-wall sections of the housing, and wherein the front face of the negatively transmissive liquid crystal display device is disposed adjacent to the transparent housing-wall section on the front face of the housing.

2. The kitchen appliance as claimed in claim 1, wherein the housing is equipped with a main area and a supplementary area, and wherein the housing is equipped, in the supplementary area, with an L-shaped development, with a shorter base section and a longer top section, and wherein the accommodating section is provided in an area of a free end of the top section, in which accommodating section the negatively transmissive liquid crystal display device is accommodated.

3. The kitchen appliance as claimed in claim 2, wherein, the top section runs essentially vertically when the kitchen appliance is set down on a horizontal work surface, and wherein the accommodating section extends transversely to the top section.

4. The kitchen appliance as claimed in claim 1, wherein the kitchen appliance is in the form of a scale.

\* \* \* \* \*